United States Patent [19]
Marasco et al.

[11] Patent Number: 5,960,460
[45] Date of Patent: Sep. 28, 1999

[54] NON-INTRUSIVE REPLICATION OF HARD DISK

[75] Inventors: Bernie R. Marasco, Superior; Frederick G. Munro, Broomfield; William E. Dunphy, Westminster; Joseph K. Puhr, Lafayette; Hilliard M. Scott, Westminster, all of Colo.

[73] Assignee: Exabyte Corporation, Boulder, Colo.

[21] Appl. No.: 08/774,733

[22] Filed: Jan. 2, 1997

[51] Int. Cl.⁶ .............................. G06F 12/16; G06F 13/10; G06F 17/30

[52] U.S. Cl. .......................... 711/162; 711/100; 711/114; 711/115; 711/161; 711/162; 711/163; 711/167

[58] Field of Search ................................ 711/4, 113, 115, 711/118, 161, 162, 163, 167, 173, 100, 114; 360/27; 395/182, 183, 200.52, 182.04; 369/84, 13

[56] References Cited

U.S. PATENT DOCUMENTS

| | | | |
|---|---|---|---|
| 4,494,156 | 1/1985 | Kadison et al. | 360/48 |
| 4,823,333 | 4/1989 | Satoh et al. | 369/84 |
| 4,972,316 | 11/1990 | Dixon et al. | 711/113 |
| 5,038,319 | 8/1991 | Carter et al. | |
| 5,321,826 | 6/1994 | Ushiro | 711/162 |
| 5,438,671 | 8/1995 | Miles | 711/4 |
| 5,469,573 | 11/1995 | McGill, III et al. | 395/712 |
| 5,544,347 | 8/1996 | Yanai et al. | 711/162 |
| 5,610,893 | 3/1997 | Soga et al. | 369/84 |
| 5,664,186 | 9/1997 | Bennett et al. | 711/162 |
| 5,675,769 | 10/1997 | Ruff et al. | 395/497 |

OTHER PUBLICATIONS

Central Point Software, Central Point Backup, hard Disk Backup for Windows and DOS, Version 7, 1991.

*Primary Examiner*—Frank J. Asta
*Assistant Examiner*—William C. Vaughn, Jr.
*Attorney, Agent, or Firm*—Nixon & Vanderhye, P.C.

[57] ABSTRACT

A computer program product embodied in a memory (FD1, FD2) implements procedures for replicating the contents of a first hard disk on a second hard disk. In a backup operation mode, the program enables a suspect computer (20S) to copy or backup sectors of its hard disk (22S) onto a temporary storage media (84) without recording on hard disk (22S). A user-designated signature, dimensioning parameters of hard disk (22S) and first checking information is also recorded on the temporary storage media (84, FD3). In a restore operation mode, the program enables a lab computer (20L) to read sectors of the hard disk (22S) from the temporary storage media (84) and to record sectors of first hard disk (22S) on the hard disk (22L) in accordance with the dimensioning parameters of hard disk (22S). The program prompts computation of second checking information with respect to sectors recorded on hard disk (22L) and usage of a comparison of the first checking information and the second checking information to confirm integrity of replication of sectors on the hard disk (22L).

24 Claims, 8 Drawing Sheets

NON-INTRUSIVE REPLICATION OF HARD DISK

This application is related to simultaneously filed U.S. patent application Ser. No. 08/735,440, entitled "ECONOMICAL REPLICATION OF HARD DISK", which is incorporated herein by reference.

BACKGROUND

1. Field of Invention

This invention pertains to information storage, and particularly to replicating the stored contents of a hard disk drive on another hard disk drive.

2. Related Art and Other Considerations

Computers have processors, such as a microprocessor, which execute coded instructions to perform various operations. Some of the coded instructions are operating system programs which are necessary to operate the computer generally. Others of the coded instructions may be application programs which are executed in the context of the operating system programs to perform specific tasks, typically interactively, for the user, e.g., word processing programs, telecommunication programs, financial programs, etc.

In conjunction with its operation, the processor of the computer requires a memory for various purposes. For example, a computer requires memory for storing the operating system programs, for storing the application programs, and for storing data (typically in the form of files) generated by the user in the course of execution of the application programs. Some of the memory is in the form of a semiconductor chip such as a random access memory (RAM). Although instructions and/or data in chip type memory are advantageously readily accessible to the processor, such memory is generally quite expensive and of limited capacity.

Therefore, most of the memory utilized by a computer is in the form of non-semiconductor memory. Non-semiconductor memory is typically slower but less expensive than chip type memory. Perhaps the most prominent type of non-semiconductor memory is a disk which usually resides in the same enclosure or housing with the circuit board(s) upon which reside e.g., the chip type memory and the processor. The disk is commonly termed a "hard disk", and traditionally is a magnetic disk (although recently optical disks are becoming common). Recording of information on the disk and retrieval of information from the disk is performed by a unit known as the disk drive. The microprocessor usually works through a special electrical circuit or chip known as a drive interface for communicating with the drive.

Other types of non-semiconductor memory are typically accessed by a computer as well, such as floppy disks and magnetic tape. In the case of magnetic tape, recording and reproducing operations are performed by a tape drive. The tape drive is typically connected to the microprocessor through a special interface or port. Tape drives have been utilized for storing information of various types, including storing a back-up copy of some or all of the contents of a computer's hard disk. While historically tape drives have been external to the computer enclosure or housing, more recently internal tape drives have been introduced, such as the Eagle™ family of tape drives manufactured by Exabyte Corporation.

From time to time it may be desired or necessary to copy the contents of a computer's existing hard disk onto another hard disk (e.g., a new hard disk). Such can occur, for example, in the case of a forensic investigation in which a suspect's hard disk is examined for obtaining evidence possibly pertinent to a criminal activity. In such copying of a hard disk, the suspect's hard disk must not be contaminated during the copying procedure. Moreover, there must be assurances that the information obtained from the suspect's hard disk is authentic and accurate. Despite these constraints, it is nevertheless desirable that the copying be convenient for the forensic user or expert who performs the copying and/or analysis.

What is needed therefore, and an object of this invention, is a way for authentically replicating the image of a first hard disk onto a second hard disk without interfering with the first hard disk.

SUMMARY

A computer program product embodied in a memory implements procedures for replicating the contents of a first hard disk (e.g., of a suspect's computer system) on a second hard disk (e.g., of a forensic laboratory computer system). The program generates an output message requesting a selection of either a backup operation mode to be executed on a suspect computer or a restore operation mode to be executed on a laboratory computer.

In the backup operation mode, the program enables the suspect computer to copy or backup sectors of the first hard disk onto a temporary storage media without recording on the first hard disk. A user-designated signature is also recorded on the temporary storage media. Further, the program causes the suspect computer to determine dimensioning parameters of the first hard disk and to record the dimensioning parameters on the temporary storage media. In addition, first checking information is recorded on the temporary storage media, the first checking information being computed with respect to a file of sectors read from the first hard disk. As the sectors of the first hard disk are being backup up, the program provides an output indicative of an estimated backup processing completion parameter, e.g., an estimated time to completion (ETA) parameter.

In the restore operation mode, the program enables the lab computer to read sectors of the first hard disk from the temporary storage media and to record sectors of the first hard disk on the second hard disk in accordance with the dimensioning parameters of the first hard disk. The program prompts computation of second checking information with respect to sectors recorded on the second hard disk and usage of a comparison of the first checking information and the second checking information to confirm integrity of the sectors recorded on the second hard disk.

The temporary storage media can be either one or both of two types of temporary storage media. For example, a first type of temporary storage media is magnetic tape and a second type of temporary storage media is magnetic (e.g., floppy) disk.

A predetermined number of the sectors of the first hard disk are copied as a file onto the temporary storage media. The first checking information is computed with respect to the file.

In an illustrated embodiment, the memory which stores the computer readable code includes floppy disks but is not limited thereto. Steps of the program comprise copying boot-enabling information, copying memory managing information, and copying RAM drive-enabling information onto the memory.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
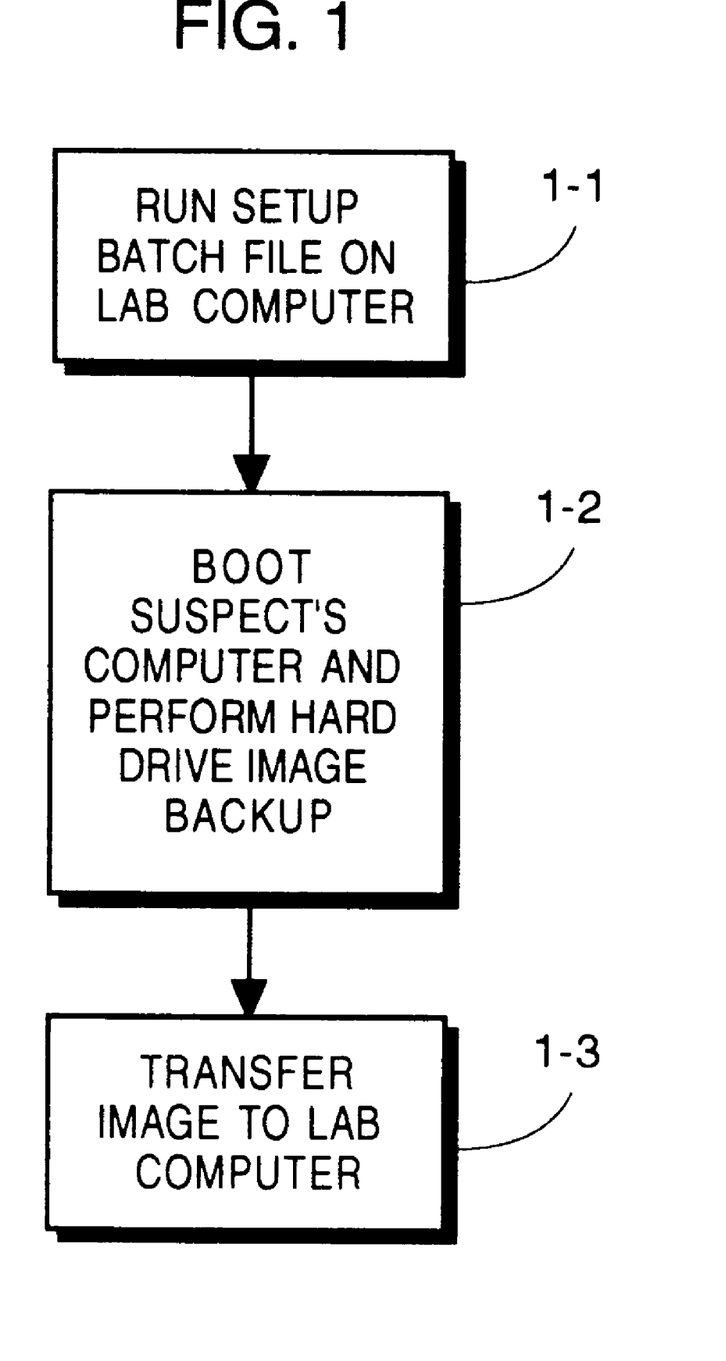
FIG. 1 is a flowchart showing basic procedures included in a hard disk replication method according to an embodiment of the invention.
Figure 2A:
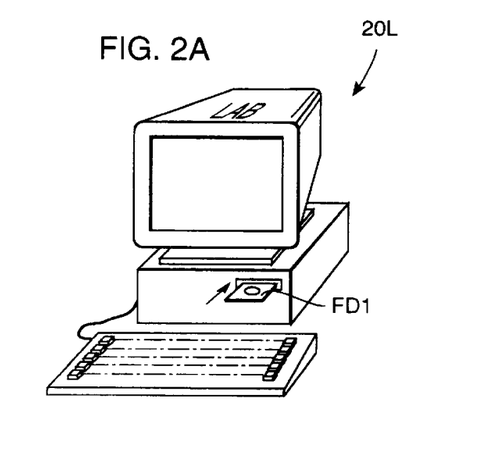
FIG. 2A is a perspective view of a laboratory computer system showing execution of a first procedure of the method of the invention.
Figure 2B:
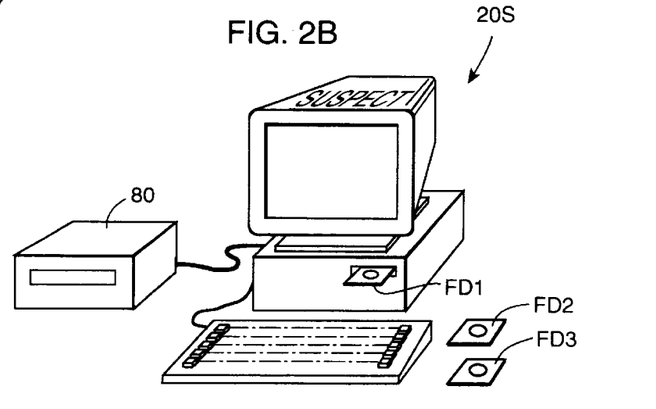
FIG. 2B is a perspective view of a suspect computer system showing execution of a second procedure of the method of the invention.
Figure 2C:
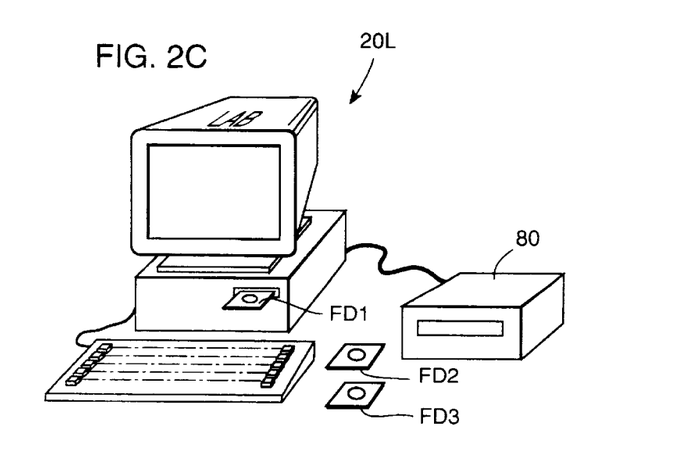
FIG. 2C is a perspective view of a laboratory computer system showing execution of a third procedure of the method of the invention.

FIG. 1, in conjunction with FIG. 2A, FIG. 2B, and FIG. 2C, show basic procedures for copying the contents of a source hard drive of a first computer 20S onto a destination hard drive of a second computer 20L. For an exemplary environment of forensic science, first computer 20S may be that of a criminal suspect, and accordingly hereinafter is known as the suspect computer 20S. Second computer 20L is that of a forensic laboratory or police station, and is hereinafter designated as lab computer 20L.

The basic procedures include first running a setup batch file on lab computer 20L, indicated as procedure 1-1 in FIG. 1. In procedure 1-1, certain boot-enabling, RAM drive-enabling, and memory management programs resident in lab computer 20L are copied onto a floppy disk FD1. Then, in procedure 1-2 (illustrated in FIG. 2B and FIG. 3B), suspect computer 20S is booted using e.g., the same floppy disk FD1 utilized in procedure 1-1 and an application floppy disk FD2. In procedure 1-2 an image of one or more hard disks of suspect computer 20S is copied onto one of the forms of temporary storage media, e.g., magnetic tape. In addition, in procedure 1-2 certain backup session processing information is recorded, some information on the first form of the temporary storage media (i.e., magnetic tape), other information on a second form of the temporary storage media (i.e., floppy magnetic disk FD3), and some on both of two forms of temporary storage media. Procedure 1-3 (illustrated in FIG. 2C and FIG. 3C) involves restoration of the image from the temporary storage media (e.g., magnetic tape) to a hard drive of lab computer 20L, with the backup session processing information from the temporary storage media (magnetic tape and/or floppy disk FD3) being employed for the restoration.

The basic procedures which are summarized above and illustrated in FIG. 1 are implemented in a computer program product which has a memory for storing computer readable code executed by processors of suspect computer 20S and lab computer 20L. The memory which stores the computer readable code includes floppy disks FD1 and FD2. It should be understood that such memory is not limited to the form of floppy disks, and that the number of memory elements (e.g., floppy disks) is not critical to the present invention.

Figure 3A:
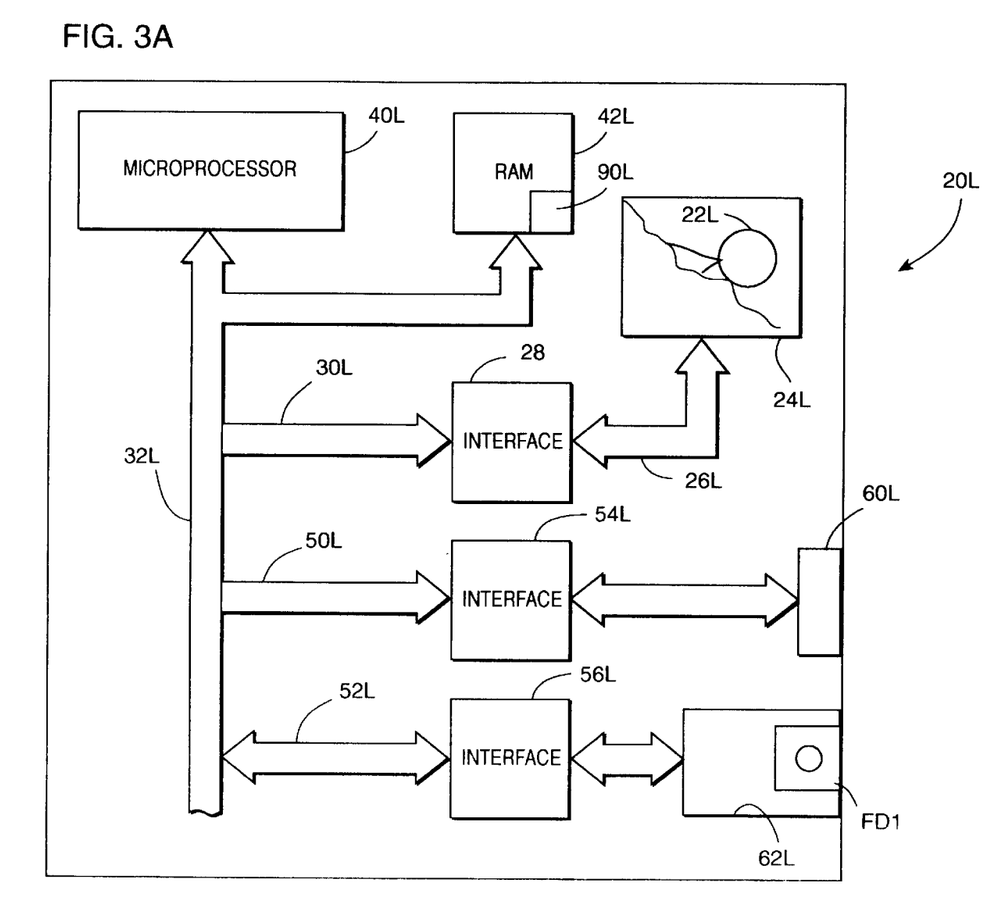
FIG. 3A is a schematic view of a laboratory computer system showing execution of a first procedure of the method of the invention.
Figure 3B:
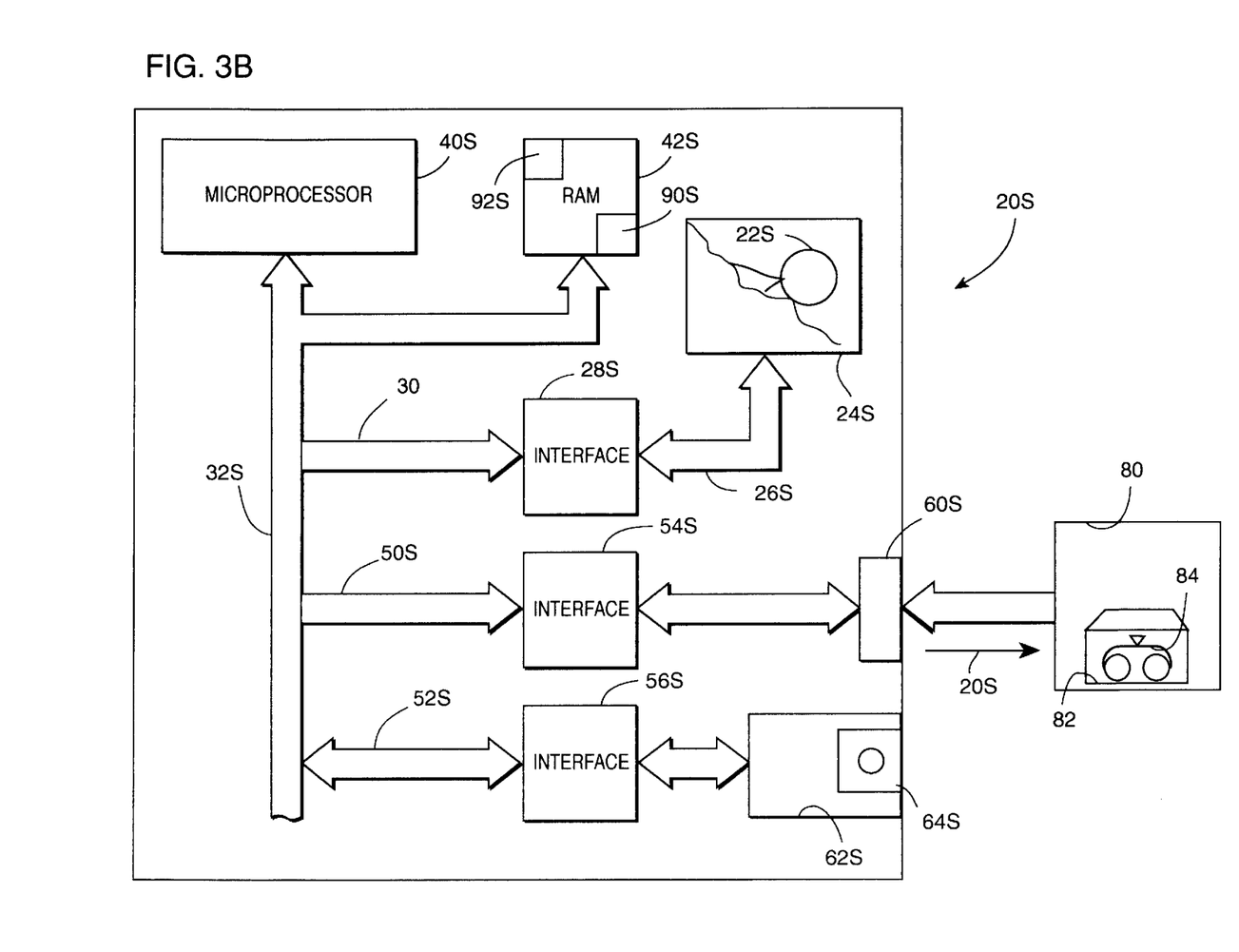
FIG. 3B is a schematic view of a suspect computer system showing execution of a second procedure of the method of the invention.
Figure 3C:
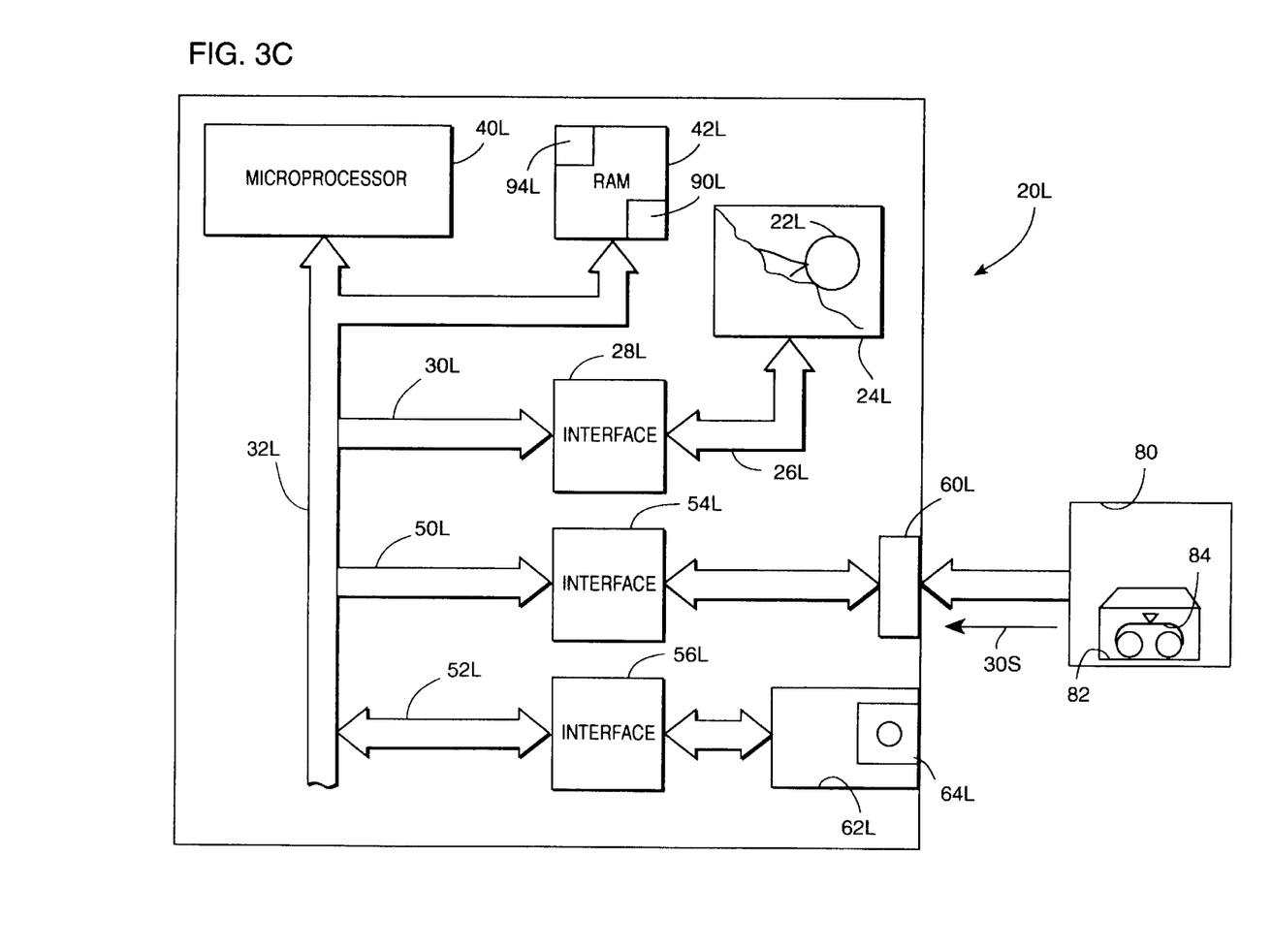
FIG. 3C is a schematic view of a laboratory computer system showing execution of a third procedure of the method of the invention.

FIG. 3A and FIG. 3C show laboratory computer system 20L, internal components and external connections thereto, for procedures 1-1 and 1-3, respectively. FIG. 3B, on the other hand, shows suspect computer 20S, internal components and external connections thereto, for procedure 1-2. For sake of facilitating the present description, it is assumed that both lab computer 20L and suspect computer 20S are internally identical, so that internal components thereof need not both be described. Accordingly, a textual description of the internal structure is provided below only for lab computer 20L, with internal components thereof having identifiers suffixed with the letter "L". Comparable components of suspect computer 20S have the same numerical identifiers but bear the suffix "S". It should be understood that, for the purposes of the present invention, the internal configuration of suspect computer 20S is similar, but typically not identical, to that of lab computer 20L.

FIG. 3A shows lab computer 20L wherein a source or original hard disk 22L resides in disk drive 24L. Disk drive 24L is connected by a bus 2GL (e.g., an ATA bus) to a first port of an interface 28L (e.g., an ATA host adapter). A second port of interface 28L is connected to bus 30L (e.g., a PCI bus), which in turn is connected to microprocessor bus 32L. Microprocessor bus 32L connects microprocessor 40L with e.g., random access memory (RAM) 42L and to buses 50L and 52L. Buses 50L and 52L are connected to interfaces 54L and 56L, respectively. Interface 54L is connected to an input/output port 60L of computer 20L; interface 56L is connected to a floppy disk drive 62L wherein a floppy disk is insertable.

Microprocessor 40L, also known as processor 40L, executes coded instructions in order to perform operations required by its operating system program, including coded instructions provided as part of application programs executed in the context of the operating system program. Hereinafter it should be understood that reference to a program being executed entails execution of coded instructions by processor 40L.

It should be understood that other elements, not particularly pertinent to the present invention, can be included in computer 20L Examples of these other elements include a read only memory (ROM), an interface to a user input device such as a keyboard, and a display driver (e.g., for driving a monitor or screen display, for example).

In procedure 1-1 (see FIG. 1), a first floppy disk (FD1) is inserted into floppy drive 62L of lab computer 20L (see FIG. 2A) and a program known as ONETIME is stored on floppy disk FD1 is loaded into RAM 42L and executed. Program ONETIME serves to copy the following onto floppy FD1: an operating system to render the floppy bootable; a RAM-DISK program which loads the RAM drive; and memory manager files (e.g., HIMEN.SYS and EMM386.SYS). The operating system can be, for example, the DOS operating system, Windows™ 3× operating system, or Windows 95™ operating system. Program ONETIME knows the location of these systems/programs/files for a given operating system, and makes the copies on floppy disk FD1.

In procedure 1-2 (see FIG. 1), suspect computer 20S is booted using floppy disk FD1. Floppy disk FD1 has the boot-enabling, RAM drive-enabling, and memory managing files previously copied thereon at procedure 1-1 as described above. Procedure 1-2 also involves using an application program on a second floppy disk FD2 to perform a backup of a hard disk 22S of suspect computer 20S (see FIG. 3B). The backup is made by replicating an image of the hard disk on a temporary storage media. As used herein, "temporary storage media" means at least one, and preferably two, forms of media which are utilized for storing sectors and/or backup session processing information. When two types of temporary storage media are employed, one form is a image-bearing temporary storage media and the other is employed to bear information (e.g., in the form of log files) regarding the backup or copying of hard disk 22S. In the illustrated embodiment, a first peripheral (e.g., tape drive 80) which handles a first form or type of storage media, e.g., magnetic tape, is connected to computer port 60S (see FIG. 2B and FIG. 3B). Tape drive 80 has a cartridge 82 inserted therein, which contains tape media 84. As used herein, tape media 84 is one example of a first type of temporary storage media and serves as the image-bearing temporary storage media. As described in more detail hereinafter, a second type of temporary storage media is floppy disk (FD3), which is used to bear log file information rather than an image of the hard disk 22S.

Figure 5:
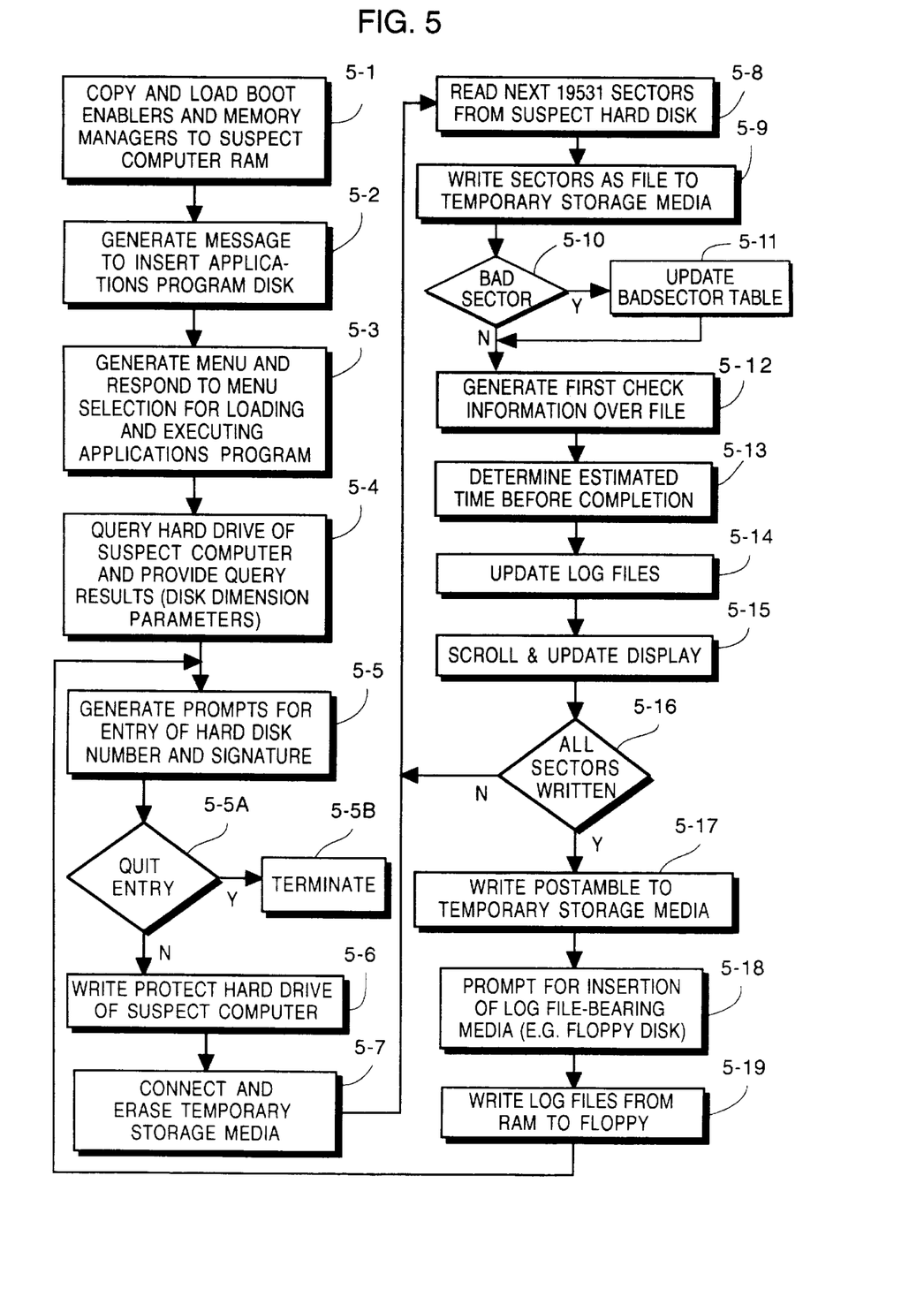
FIG. 5 is a flowchart showing steps executed at a suspect computer in order to copy an image of a hard disk of a suspect computer onto a temporary storage media.

Steps involved in the copying of an image from disk 22S to media 84 are described in more detail in connection with FIG. 5. At step 5-1, floppy disk FD1 is loaded into floppy drive 62S of suspect computer 20S and executed. As indicated previously, floppy disk FD1 has boot-enabling, RAM drive-enabling, and memory manager files copied thereon. The RAM drive-enabling file, e.g., RAMDISK program, is important for enabling rapid writing and access to RAM 42S, since RAM 42S must be used as a temporary storage area for storing various information including log files which are hereinafter described. Usage of RAM 42S and floppy drive 62S obviates contamination of hard disk 22S with any data generated by the present invention.

Floppy disk FD1 also causes generation of a message (e.g., on a display/monitor) to insert the second floppy, FD2, which has the applications program stored thereon, into floppy drive 62S (see step 5-2). After second floppy FD2 is inserted and loaded into RAM 42S, execution thereof prompts generation of a menu (step 5-3). The menu requests the forensic user to select one of the following options or operation modes: (1) make an image (backup operation mode), or (2) restore an image (restore operation mode). The first option is selected at the suspect computer 20S; the second option is selected at the lab computer 20L as depicted in procedure 1-3 and described in more detail in FIG. 6. In response to selection of the first menu option, instructions pertaining thereto are loaded into RAM 42S and executed. The remainder of the steps of FIG. 5 basically depict operations undertaken by processor 40S in connection with the execution of these image making instructions.

At step 5-4, processor 40S accesses the disk drive parameters for source hard disk 22S. The disk drive parameters include information such as the hard disk number (since there may be as many as two interfaces 28S, and each interface may be connected to as many as two hard drives, resulting in a total of four possible hard disks), the number of cylinders in the disk drive, the number of heads in the disk drive, and the number of sectors per track on source hard disk 22S. Those skilled in the art will understand how the disk drive parameters are obtained. For example, at step 5-4 processor 40 can query drive 24S by sending a DOS assembly language type of call known as "get drive parameters (int 13h, function 8h)." The information obtained at step 5-4 is stored in a log file SCREEN.LOG, which (along with other log files hereinafter described) occupies location 94S in RAM 42S. Appendix 1 shows example contents of log file SCREEN.LOG for a particular suspect computer 20S having only one hard drive 22S. It should be understood that, for a computer having more hard disks, additional record/lines would appear for each hard disk for providing corresponding information for those hard disks.

At step 5-5, processor 40S generates further displays on a monitor. A first display is a prompt inquiring which of as many as four hard disks of suspect computer 20S is to be replicated. In essence, the contents of this first display are understood from the log file SCREEN.LOG (see Appendix 1). The second display is a prompt for the forensic user to enter a "signature", i.e., an identifier to be associated with the particular job or project. The signature can comprise e.g., the name of the forensic, a case file number or other identifier, date and time of day information, etc.

Step 5-6 is write protection of the selected hard disk 22S of suspect computer 20S. While any of various write protect techniques can be employed, a particularly suitable write protection scheme is afforded by a program entitled PROTECT which appeared in the January 1996 edition of *PC Magazine*. Write protect step 5-6 assures integrity of hard disk 22S while its image is being made.

As mentioned before, a peripheral having the first form of temporary storage media, e.g., magnetic tape 84, is connected to suspect computer 20S. In the illustrated embodiment, the peripheral is a tape drive 80, and preferably a parallel port tape drive such as that marketed by Datasonix Corporation as Pereos™. While external parallel ported tape drives are currently preferred, other tape drives, including internally nested tape drives such as the Eagle™ family of tape drives marketed by Exabyte Corporation are suitable. In addition, the second form of temporary storage media is accessed. In the illustrated embodiment wherein the second form of temporary storage media is floppy disk, floppy disk FD3 is inserted into floppy disk drive 62 so that information, e.g., log files, can be recorded thereon.

At step 5-7, the form of temporary storage media which will bear the copy of hard disk 22S, e.g., magnetic tape 84, is erased. Assuming the peripheral for media 84 is connected to suspect computer 20S, at step 5-7 media 84 is rewound and erased. In view, e.g., of the erasure of step 5-7, should the forensic user desire to make images of more than one of the hard disks of suspect computer 20S, separate storage media (e.g., separate cartridges 82, separate floppy FD3) must be used for each hard disk.

Sectors from hard disk 22S of suspect computer 20S are read and copied as files onto storage media 84. That is, 512 byte sectors of hard disk 22 are sequentially read and outputted one sector at a time to tape drive 80 in a series of files, each file constituting 10 Megabytes. Thus, a predetermined number of sectors (19531 sectors) are grouped together and recorded as a 10 MB file on media 84.

Figure 4:
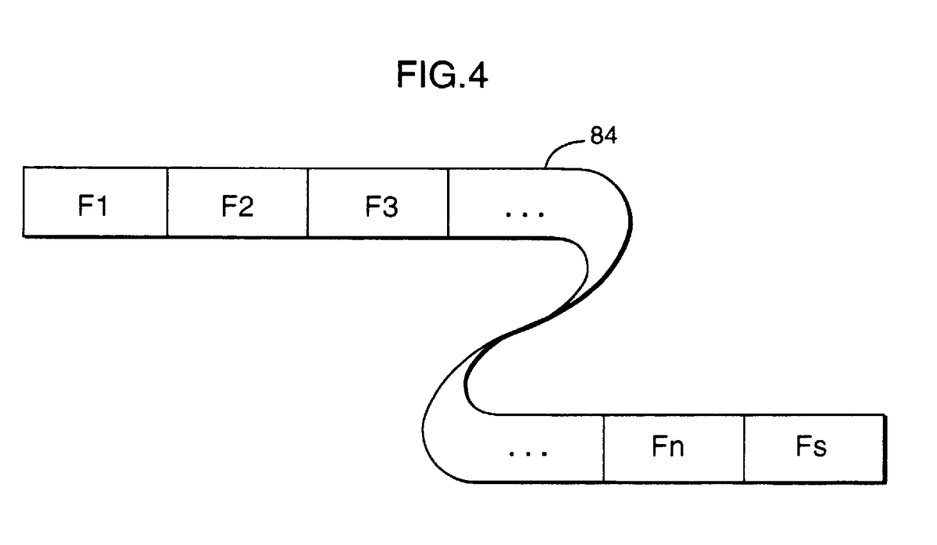
FIG. 4 is a schematic view showing the format of one type of temporary storage media according to an embodiment of the invention.

The contents of tape media 84 is shown in FIG. 4. A first group of 512 byte sectors from hard disk 22 is read and outputted to fill a first file F1 on tape media 84; a second group of sectors is read and outputted to file F2, and so forth continuing to file Fn. Arrow 205 in FIG. 3B depicts the recording of sectors in file format on tape 84.

Steps 5-8 through 5-16 are executed for the sectors which are grouped into a file. At step 5-8, the 19531 sectors are sequentially read, one at a time, from hard disk 22S. Step 5-9 shows the 19531 sectors being written, one at a time, as a 10 Megabyte file to media 84. If it turns out that one of the sectors is not readable (as indicated by step 5-10), a BAD-SECTOR table is updated (at step 5-11) with the address of the unreadable sector. A sector is deemed not readable if a bad return code is received in response to a read request (e.g., an interrupt 13 function 2).

As each sector is being read and assembled into one of the files for recording on tape 84, processor 40 computes check information for each file, as indicated by step 5-12. In the illustrated embodiment, the first check information is a 32 bit cyclical redundancy check (CRC) computed for each file. The CRCs computed at step 5-12 constitute first check information for distinction from second check information which is regenerated in procedure 1-3 upon restoration of an image from media 84.

At step 5-13 processor 40S determines an estimated time before completion ("ETA"), i.e., a projected length of time required to finish making the image of the hard disk 22S on media 84. The ETA is an example of a estimated backup processing completion parameter. As a result of the query of hard drive parameters previously executed at step 5-5, processor 40S knows the number of sectors recorded on hard disk 22S. After the first file F1 has been recorded on media 84, processor 40S can determine the length of time that was required to backup the first 19531 sectors on media 84, and thereby determine a sector backup rate. Knowing the number of sectors yet to backup, based on the current sector backup rate, processor 40S can estimate the time required to finish backing up all sectors. As each file is recorded on media 84, processor 40S can update its sector backup rate, and based thereon can revise the estimate of the time required to finish backing up all sectors.

Step 5-14 involves updating log files maintained in RAM locations 92S during the backup operation. The following log files are maintained by processor 40S and stored in log file memory locations 92S: BACKUP SCREEN.LOG and IMGBACK.LOG. Contents of examples of these log files upon completion of backup of all sectors are shown in Appendices 2 and 3, respectively.

Step 5-15 involves a display on a monitor of log file BACKUP SCREEN.LOG. Contents of an example BACKUP SCREEN.LOG are shown in Appendix 2. As each file Fx is recorded to media 84, a new "Written to Tape" record/line display is generated based on the contents of BACKUP SCREEN.LOG. Each record/line shows the number of files written, the file name, and the estimated time to completion (ETA—see step 5-13). For example, the file name of the first file F1 is "00000001.SEC"; the file name of the second file F2 is "00019532.SEC"; and so on, it being understood that the name of a file depends on the sector number of the first sector in that file. The display of step 5-15 is scrolled as each new record/line appears on the monitor.

Step 5-16 involves checking whether all sectors from hard disk 22S have been copied onto media 84. If not, the loop comprising steps 5-8 through 5-16 is repeated for the next remaining 19531 sectors on hard disk 22S. The loop is repeated for each file Fx, until all sectors have been read and all files Fx including last file Fn have been recorded on media 84.

By virtue of containing files F1 through Fn, media 84 is said to contain an "image" of the source or original hard disk 22. After all files (Fx, x=1, . . . , n) have been recorded on tape 84, processor 40 prepares and writes to tape 84 a postamble Fs (step 5-17). Postamble Fs includes the signature entered by the forensic user at step 5-5, as well as a special file having session information formatted as shown in Table 1. The special file includes the parameters gleaned at step 5-4 regarding disk drive 24S, and the CRCs computed at step 5-12.

TABLE 1

Format of Postamble Special File

| length | description |
| --- | --- |
| 1 byte | format version |
| 1 byte | physical disk number |
| 4 bytes | total number of sectors recorded |
| 4 bytes | number of sectors per file |
| 4 bytes | number of bytes per sector |
| variable | CRC table |
| variable | bad sector map |
| 4 bytes | number of cylinders on suspect disk |
| 4 bytes | number of heads on suspect disk |
| 4 bytes | number of sectors per track on suspect disk |

In the particular embodiment herein illustrated, the number of sectors per file is 19531 and the number of bytes per sector is 512.

At step 5-18, processor 40S causes generation of a display to ensure that a floppy disk (FD3) is inserted in floppy disk drive 62S. After it is sensed that floppy disk FD3 is inserted in disk drive 62S, at step 5-19 processor 40S records the log files stored in RAM memory locations 94S, e.g., BACKUP SCREEN.LOG and IMGBACK.LOG., on the floppy disk.

Log file BACKUP SCREEN.LOG has been discussed above in conjunction with Appendix 2 and steps 5-14 and 5-15. IMGBACK.LOG, exemplary contents thereof being shown in Appendix 3, provides e.g., a listing of CRC values previously calculated (at step 5-12) for each file. Each record/line of a "DISK CRC'S" portion of log file IMG-BACK.LOG includes a beginning and end sector number for each file Fx as well as the CRC value generated for that corresponding file.

After an image of the entire hard disk 22S has been stored on media 84, and after a postamble Fs has been written to media 84 and the log files recorded on floppy disk FD3, the forensic user has the option of making an image of another of any remaining hard disks in suspect computer 20S. In this regard, after completion of step 5-19, processor 40S returns to step 5-5 to display again the contents of log file SCREEN-.LOG. If a plurality of hard disks are indicated on the screen of log file SCREEN.LOG, the forensic user can specify that an image is to be made of another hard disk. Otherwise, the forensic user can specify to terminate all hard disk imaging operations. Step 5-5A shows processor 40S checking to see if the forensic user has indicated that he is ready to quit copying of hard disks. In case of a quit indication, procedure 1-2 is terminated (see step 5-5B). Otherwise, if another hard disk is to be imaged, the remaining steps 5-6 through 5-19 are executed for the next hard disk to-be-copied of suspect computer 20S (a new cassette of media 84 and new floppy FD3 being inserted [see step 5-7]).

The foregoing steps 5-1 through 5-19, included in procedure 1-2 of FIG. 1, are executed at suspect computer 20S, and result in an image of hard disk 22S being replicated on media 84. In addition, postamble information was recorded on media 84 and log files were recorded on floppy disk FD3.

Figure 6:
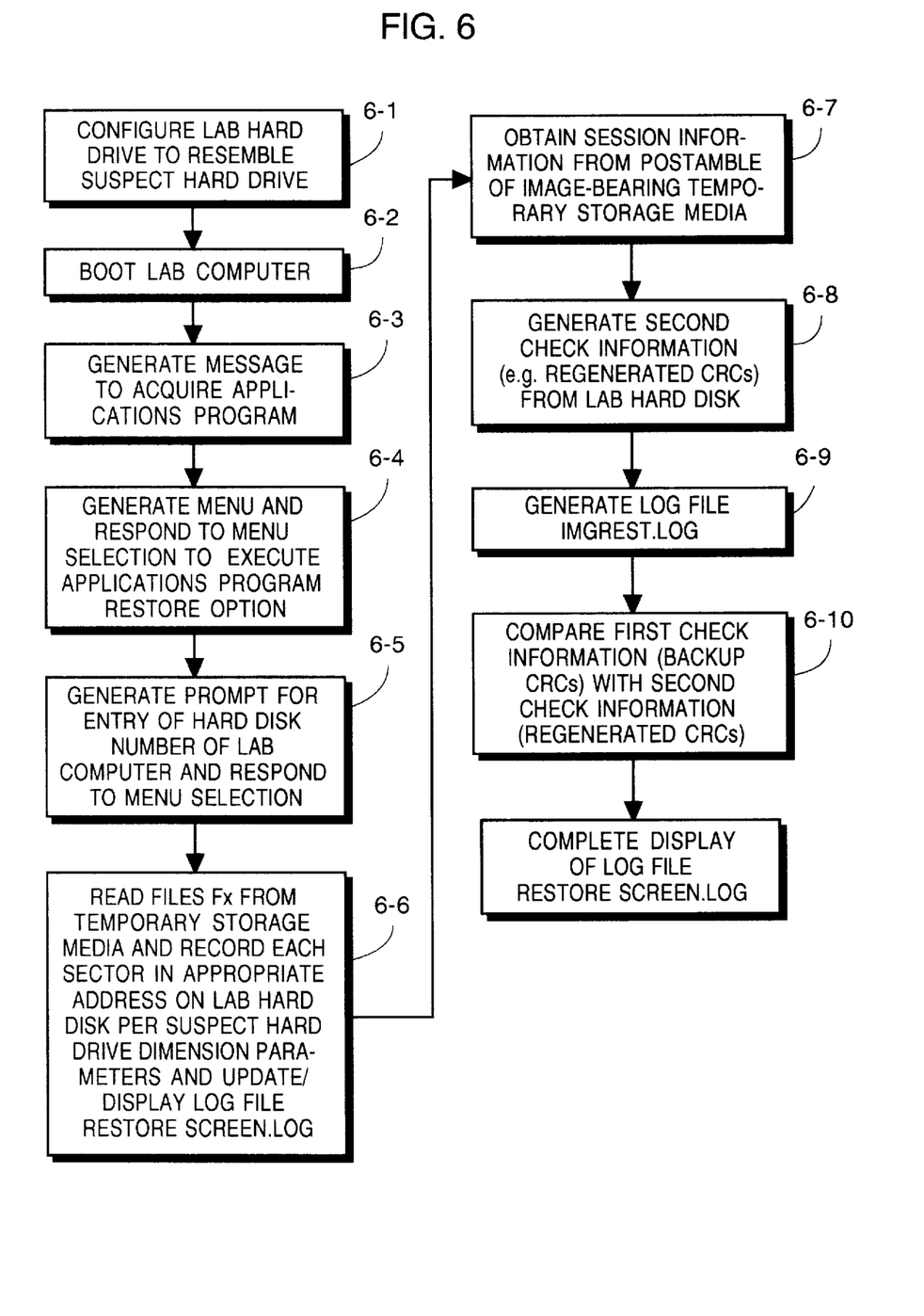
FIG. 6 is a flowchart showing steps executed at a laboratory computer in order to copy an image of a hard disk of a suspect computer from a temporary storage media to a hard disk of the laboratory computer.

Procedure 1-3 is performed at lab computer 20L, to which media 84 and floppy disk FD3 have been transported. Procedure 1-3 essentially involves transferring the image from media 84 to hard drive 22L of lab computer 20L, with the backup session processing information from media 84 and floppy disk FD3 being employed for the transfer. Steps involved in procedure 1-3 are shown in FIG. 6.

In procedure 1-3, at step 6-1 hard disk 22L of computer 20L is configured to resemble hard disk 22S of suspect computer 22S. Configuration of hard disk 22L is usually necessary, since it is unlikely that hard disk 22L will have the same addressing dimensions or dimensioning parameters (e.g., number of cylinders, number of heads, number of sectors per track) as hard disk 22S. In order to obtain the necessary information for the configuration of hard disk 22L, the forensic user notes the hard disk parameters provided by log file SCREEN.LOG at step 5-5 in order to know how the hard disk 22L is to be addressed.

In order to configure hard disk 22L of lab computer 20L to be similar to that of hard disk 22S of suspect computer 20S, at step 6-1 the forensic user initiates a BIOS set up procedure. Initiation of the BIOS set up procedure can be activated by a special key e.g., during a bootup operation. In the BIOS set up procedure, the forensic user can enter each of the parameters of hard disk 22S of suspect computer 20S (e.g., number of cylinders, number of heads, number of sectors per track) as being the parameters of hard disk 22L of lab computer 20L.

At step 6-2, floppy disk FD1 is inserted in floppy disk drive 62L in order to boot lab computer 20L. Toward the end of the booting operation, processor 40L causes generation of a message to acquire the applications program, e.g., to insert the next floppy disk FD2 (step 6-3). Insertion of floppy disk FD2, followed by loading of contents thereof into RAM 42L and execution, prompts generation at step 6-4 of a menu display on the monitor of lab computer 20L. The menu display of step 6-4, like that of step 5-3, requests the forensic user to select one of the following options: (1) make an image, or (2) restore an image. The second option is selected at the lab computer 20L. In response to selection of the second menu option, instructions pertaining thereto are loaded into RAM 42L and executed. The remainder of the steps of FIG. 6 basically depict operations undertaken by microprocessor 40L in connection with the execution of these image restoration instructions.

At step 6-5 processor 40L generates a display including an inquiry as to which of the hard disks of lab computer 20L is to be utilized as a destination drive in the image restoration operation.

At step 6-6 processor 40L reads each 10 Megabyte file Fx from media 84 and records each sector of each file at an appropriate address on hard disk 22L. The direction of information transfer from tape drive 80 to lab computer 20L is shown by arrow 305 in FIG. 3C. Recording of sectors on hard disk 22L is not necessarily strictly sequential, but rather takes into consideration the dimensioning parameters of hard disk 22S of suspect computer 20S. That is, a sector from hard disk 22S of suspect computer 20S is recorded at the same address on hard disk 22L of laboratory computer 20L as it was on hard disk 22S of suspect computer 20S, despite the fact that the native dimensioning of hard disk 22L of laboratory computer 20L may be, and likely is, different from that of hard disk 22S of suspect computer 20S.

RAM 42L of lab computer 20L also has address locations 94L reserved for storing certain log files, particularly log files RESTORE SCREEN.LOG; IMGSESS.LOG; IMGCRCS.LOG; and IMGREST.LOG, each of which are described separately hereinafter. As part of step 6-6, as each file is obtained from media 84 and recorded on hard disk 22L, a log file RESTORE SCREEN.LOG is updated and displayed on the monitor. Appendix 4 shows an example of the contents of log file RESTORE. In particular, as each file Fx is copied to hard disk 22L, a new "Restored from Tape" record/line appears on the monitor, supplying the name of the file Fx which was copied. In this regard, it will be remembered that the name of a file is the sector number of the first sector in the file. With the recording of each new file to hard disk 22L, the display on the monitor is scrolled with the appearance of a new "Restored from Tape" record/line.

After all sectors have been read from media 84 and written to hard disk 22L, it is said that the image of hard disk 22S has been restored onto hard disk 22L. Then, at step 6-7, the read head of media handling-peripheral 80 is positioned to read and does read session information in postamble Fs. As part of step 6-7, the session information is stored in log file IMGSESS.LOG, an example of which appears in Appendix 5. The session information stored in log file IMGSESS.LOG includes not only the signature and disk dimension information of the suspect hard disk 22S, but also the CRCs generated at the time of backup (see Table 1).

Step 6-8 involves reading each of the sectors recorded, e.g., restored, onto hard disk 22L in 10 Megabyte groups or files, and computing check information for each file. The check information computed at step 6-8 is also known as second check information, and comprises 32 bit CRC values for each file computed in accordance with the same CRC rule imposed at step 5-12. The CRCs generated at step 6-8 are thus referred to as "regenerated" CRCs. The regenerated CRCs are stored in a log file entitled IMGCRCS.LOG. Example contents of a log file IMGCRCS.LOG are shown in Appendix 6.

Step 6-9 involves generating log file IMGREST.LOG. Example contents of log file IMGREST.LOG are shown in Appendix 7. Log file IMGREST.LOG includes a listing of the files Fx (by disk sector range) and, along with each file Fx, its expected (backup-obtained) CRC [obtained from log file IMGSESS.LOG] and its generated (more accurately, its "regenerated") CRC [stored in log file IMGCRCS.LOG].

At step 6-10, using log file IMGREST.LOG, the regenerated CRC values (calculated at step 6-8) are compared with corresponding backup CRC values. For each file Fx, if the regenerated CRC value equals the expected backup CRC value, an entry is made in log file IMGREST.LOG indicating that file Fx is a "PASS".

At step 6-11, log file RESTORE SCREEN.LOG (see Appendix 4) is updated and displayed. In particular, for each file Fx a "Verify Pass" record/line is stored in log file RESTORE SCREEN.LOG. The display on the monitor is then updated in scrolling fashion to provide a "Verify Pass" display line for each file, indicating whether that file "passed" or "failed" its CRC check. If all files Fx pass the CRC check, a line "Verify Pass Completed: PASSED WITH SUCCESS!!!" is generated (see Appendix 4), thereby confirming integrity of the sectors recorded on hard disk 22L.

After the image of hard disk 22S of suspect computer 20S has been restored to hard disk 22L of lab computer 20L, the forensic expert can analyze hard disk 22L using conventional forensic tools. In addition, in view of the fact that sectors are stored in files, the forensic expert can restore sectors of the image as normal files. These files can then be analyzed using file-based tools such a binary editors/viewers, etc. Thus, the files of the image can be restored using non-image restore software for the purpose of sector level analysis one file at a time.

The present invention thus facilitates non-intrusive replication of the suspect's hard disk 22S by write protecting hard disk 22S and using instead RAM 42S and temporary storage media (tape 84 and floppy disks 64) in the copying process. After an image of the suspect's hard disk 22S is replicated on lab hard disk 22L, the authenticity of the image is verified by CRC checking. Sectors are backed up onto tape as files, each file having 10 Megabytes holding 19,531 sectors. The CRCs cover the files of sectors, so one failure does not invalidate whole image restoration. The files can be restored using non-image restore software for the purpose of sector level analysis one file at a time.

While the invention has been particularly shown and described with reference to the preferred embodiments thereof, it will be understood by those skilled in the art that various alterations in form and detail may be made therein without departing from the spirit and scope of the invention. For example, it should be understood that some information recorded on a first form of temporary storage media, e.g., on magnetic tape, can instead be recorded on a second form of temporary storage media, e.g., on floppy disk, and vise versa. Such being the case, usage of "temporary storage media" herein encompasses one or more forms of storage media, employed either individually or collectively, to store information such as the backup session processing information.

APPENDIX 1

GET INFO COMMAND SCREEN.LOG

| PHYSICAL DISK | CYLINDERS | HEADS | SECTORS/TRACK | TOTAL SECTORS |
|---|---|---|---|---|
|  | 1024 | 12 | 34 | 417792 |

APPENDIX 2

BACKUP SCREEN.LOG

Checking Connection
Erase Volume
Synchronizing . . .
Rewinding . . .
Erasing BOV . . .
Rewinding . . .
Initialize Volume
Writing . . .
User Data Transfer
Seeking . . .
Searching . . .
Writing . . .
Written to Tape (file 1 of 22): X:\00000001.SEC, ETA = calculating
Written to Tape (file 2 of 22): X:\00019532.SEC, ETA = 00:39:40
Written to Tape (file 3 of 22): X:\0039063.SEC, ETA = 00:41:35
Written to Tape (file 4 of 22): X:\00058594.SEC, ETA = 00:43:42
Written to Tape (file 5 of 22): X:\00078125.SEC, ETA = 00:41:57
Written to Tape (file 6 of 22): X:\00097656.SEC, ETA = 00:39:20

APPENDIX 2-continued

BACKUP SCREEN.LOG

Written to Tape (file 7 of 22): X:\00117187.SEC, ETA = 00:38:00
Written to Tape (file 8 of 22): X:\00136718.SEC, ETA = 00:35:50
Written to Tape (file 9 of 22): X:\00156249.SEC, ETA = 00:33:51
Written to Tape (file 10 of 22): X:\00175780.SEC, ETA = 00:31:36
Written to Tape (file 11 of 22): X:\00195311.SEC, ETA = 00:29:08
Written to Tape (file 12 of 22): X:\00214842.SEC, ETA = 00:26:30
Written to Tape (file 13 of 22): X:\00234373.SEC, ETA = 00:24:03
Written to Tape (file 14 of 22): X:\00253904.SEC, ETA = 00:21:28
Written to Tape (file 15 of 22): X:\00273435.SEC, ETA = 00:18:55
Written to Tape (file 16 of 22): X:\00292966.SEC, ETA = 00:16:36
Written to Tape (file 17 of 22): X:\00312497.SEC, ETA = 00:14:10
Written to Tape (file 18 of 22): X:\00332028.SEC, ETA = 00:11:44
Written to Tape (file 19 of 22): X:\00351559.SEC, ETA = 00:09:18
Written to Tape (file 20 of 22): X:\00371090.SEC, ETA = 00:06:50
Written to Tape (file 21 of 23): X:\00390621.SEC, ETA = 00:04:25
Written to Tape (file 22 of 22): X:\00410152.SEC, ETA = 00:02:00
System Data Transfer
Close Volume
Flushing . . .
Dismount Volume
Seeking . . .
Idle
Planned Files Requested: 22
Planned Files Completed: 22
Bytes Requested:         213909504
Bytes Completed:         213909504
Bytes Per Minute:        9789908.6
Data Compression:        ON
Compression Ratio:       1.96:1
Re-Write Count:          0
Reposition Cycles:       94
Tape Optimization:       ON
Current Tape Count:      3226 (35 percent of current tape side)
SUCCESS: Write Session complete.

APPENDIX 3

IMGBACK.LOG

IMAGE BACKUP LOG ENTRY
PHYSICAL DISK CHARACTERISTICS:

DISK NUMBER: 1
TOTAL NUMBER OF DISK SECTORS: 0417792
ASSUMED BYTES PER SECTOR: 512
NUMBER OF CYLINDERS: 1024
NUMBER OF HEADS: 12
NUMBER OF SECTORS PER TRACK: 34
DISK SECTORS BACKED UP: 0000001–0417792
BACKUP SIGNATURE (USER INPUT):

Sargent Joe Puhr
Boulder County Sheriff's Office
case # 2489532
Suspect Berine Marasco
date 3/21/96
DISK SECTORS NOT READABLE:

NO BAD SECTORS
DISK CRC'S:

| DISK SECTOR RANGE | GENERATED CRC |
|---|---|
| 0000001–0019531 | 0xe78b767d |
| 0019532–0039062 | 0x4b5a0bd0 |
| 0039063–0058593 | 0xbd83d583 |
| 0058594–0078124 | 0x6cafc73c |
| 0078125–0097655 | 0x99bdc213 |
| 0097656–0117186 | 0x1df67658 |
| 0117187–0136717 | 0x062a9fb9 |
| 0136718–0156248 | 0x92bfbb62 |
| 0156249–0175779 | 0x08ffc873 |
| 0175780–0195310 | 0x9a581650 |
| 0195311–0214841 | 0x3854135c |

APPENDIX 3-continued

IMGBACK.LOG

| | |
|---|---|
| 0214842–0234372 | 0x71eec31e |
| 0234373–0253903 | 0x6a43190c |
| 0253904–0273434 | 0x6fd903c8 |
| 0273435–0292965 | 0x65d05476 |
| 0292966–0312496 | 0xec9e8f02 |
| 0312497–0332027 | 0xab6797b2 |
| 0332028–0351558 | 0x840bc369 |
| 0351559–0371089 | 0xa8ab6174 |
| 0371090–0390620 | 0x1727c690 |
| 0390621–0410151 | 0x190eab56 |
| 0410152–0417792 | 0x76b4465a |

APPENDIX 4

RESTORE SCREEN.LOG

Checking Connection
Mount Volume
Synchronizing . . .
Searching . . .
Reading . . .
Open Volume
Seeking . . .
Searching . . .
Reading . . .
Unpacking . . .
Updating . . .
Idle
Open Session
Updating . . .
Close Session
Idle
Data Transfer
Seeking . . .
Searching . . .
Reading . . .
Restored from Tape (file 1 of 22): X:\00000001.SEC
Restored from Tape (file 2 of 22): X:\00019532.SEC
Restored from Tape (file 3 of 22): X:\00039063.SEC
Restored from Tape (file 4 of 22): X:\00058594.SEC
Restored from Tape (file 5 of 22): X:\00078125.SEC
Restored from Tape (file 6 of 22): X:\00097656.SEC
Restored from Tape (file 7 of 22): X:\00117187.SEC
Restored from Tape (file 8 of 22): X:\00136718.SEC
Restored from Tape (file 9 of 22): X:\00156249.SEC
Restored from Tape (file 10 of 22): X:\00175780.SEC
Restored from Tape (file 11 of 22): X:\00195311.SEC
Restored from Tape (file 12 of 22): X:\00214842.SEC
Restored from Tape (file 13 of 22): X:\00234373.SEC
Restored from Tape (file 14 of 22): X:\00253904.SEC
Restored from Tape (file 15 of 22): X:\00273435.SEC
Restored from Tape (file 16 of 22): X:\00292966.SEC
Restored from Tape (file 17 of 22): X:\00312497.SEC
Restored from Tape (file 18 of 22): X:\00332028.SEC
Restored from Tape (file 19 of 22): X:\00351559.SEC
Restored from Tape (file 20 of 22): X:\00371090.SEC
Restored from Tape (file 21 of 22): X:\00390621.SEC
Close Volume
Restored from Tape (file 22 of 22): X:\00410152.SEC
Idle
Idle
Close Volume
Dismount Volume
Seeking . . .
Idle
VERIFY PASS, CRC (1 of 22) for sector range: 0000001–0019531 => PASS
VERIFY PASS, CRC (2 of 22) for sector range: 0019532–0039062 => PASS
VERIFY PASS, CRC (3 of 22) for sector range: 0039063–0058593 => PASS
VERIFY PASS, CRC (4 of 22) for sector range: 0058594–0078124 => PASS
VERIFY PASS, CRC (5 of 22) for sector range: 0078125–0097655 =>

APPENDIX 4-continued

RESTORE SCREEN.LOG

PASS
VERIFY PASS, CRC (6 of 22) for sector range: 0097656–0117186 => PASS
VERIFY PASS, CRC (7 of 22) for sector range: 0117187–0136717 => PASS
VERIFY PASS, CRC (8 of 22) for sector range: 0136718–0156248 => PASS
VERIFY PASS, CRC (9 of 22) for sector range: 0156249–0175779 => PASS
VERIFY PASS, CRC (10 of 22) for sector range: 0175780–0195310 => PASS
VERIFY PASS, CRC (11 of 22) for sector range: 0195311–0214841 => PASS
VERIFY PASS, CRC (12 of 22) for sector range: 0214842–0234372 => PASS
VERIFY PASS, CRC (13 of 22) for sector range: 0234373–0253903 = PASS
VERIFY PASS, CRC (14 of 22) for sector range: 0253904–0273434 => PASS
VERIFY PASS, CRC (15 of 22) for sector range: 0273435–0292965 => PASS
VERIFY PASS, CRC (16 of 22) for sector range: 0292966–0312496 => PASS
VERIFY PASS, CRC (17 of 22) for sector range: 0312497–0332027 => PASS
VERIFY PASS, CRC (18 of 22) for sector range: 0332028–0351558 => PASS
VERIFY PASS, CRC (19 of 22) for sector range: 0351559–0371089 => PASS
VERIFY PASS, CRC (20 of 22) for sector range: 0371090–0390620 => PASS
VERIFY PASS, CRC (21 of 22) for sector range: 0390621–0410151 => PASS
VERIFY PASS, CRC (22 of 22) for sector range: 0410152–0417792 => PASS
Verify Pass Completed: PASSED WITH SUCCESS!!!
Planned Files Requested: 22
Planned Files Completed: 22
Bytes Requested:         213909504
Bytes Completed:         213909504
Bytes Per Minute:        7567553.2
Data Compression:        ON
Compression Ratio:       0.00:1
Re-Write Count:          0
Reposition Cycles:       208
Tape Optimization:       ON
Current Tape Count:      3242 (36 percent of current tape side)
SUCCESS: Read Session complete.

APPENDIX 5

IMGESS.LOG

IMAGE GET SESSION INFORMATION LOG ENTRY
(INFORMATION ABOUT IMAGE ON TAPE)
PHYSICAL DISK
CHARACTERISTICS OF DISK THAT WAS BACKED UP:

DISK NUMBER: 1
TOTAL NUMBER OF DISK SECTORS: 0417792
ASSUMED BYTES PER SECTOR: 512
NUMBER OF CYLINDERS: 1024
NUMBER OF HEADS: 12
NUMBER OF SECTORS PER TRACK: 34
DISK SECTORS BACKED UP: 0000001–0417792
BACKUP SIGNATURE (USER INPUT):

Sargent Joe Puhr
Boulder County Sheriff's Office
case # 2489532
Suspect Berine Marasco
date 3/21/96
DISK SECTORS NOT READABLE AT TIME OF BACKUP:

APPENDIX 5-continued

IMGESS.LOG

NO BAD SECTORS
CRC'S GENERATED AT TIME OF BACKUP:

| DISK SECTOR RANGE | GENERATED CRC |
|---|---|
| 0000001–0019531 | 0xe78b767d |
| 0019532–0039062 | 0x4b5a0bd0 |
| 0039063–0058593 | 0xbd83d583 |
| 0058594–0078124 | 0x6cafc73c |
| 0078125–0097655 | 0x99bdc213 |
| 0097656–0117186 | 0x1df67658 |
| 0117187–0136717 | 0x062a9fb9 |
| 0136718–0156248 | 0x92bfbb62 |
| 0156249–0175779 | 0x08ffc873 |
| 0175780–0195310 | 0x9a581650 |
| 0195311–0214841 | 0x3854135c |
| 0214842–0234372 | 0x71eec31e |
| 0234373–0253903 | 0x6a43190c |
| 0253904–0273434 | 0x6fd903c8 |
| 0273435–0292965 | 0x65d05476 |
| 0292966–0312496 | 0xec9e8f02 |
| 0312497–0332027 | 0xab6797b2 |
| 0332028–0351558 | 0x840bc369 |
| 0351559–0371089 | 0xa8ab6174 |
| 0371090–0390620 | 0x1727c690 |
| 0390621–0410151 | 0x190eab56 |
| 0410152–0417792 | 0x76b4465a |

APPENDIX 6

IMGCRCS.LOG

IMAGE CRC LOG ENTRY
(DISK READ AND CRC GENERATION ONLY)
PHYSICAL DISK CHARACTERISTICS:

DISK NUMBER: 1
TOTAL NUMBER OF DISK SECTORS: 0417792
ASSUMED BYTES PER SECTOR: 512
NUMBER OF CYLINDERS: 1024
NUMBER OF HEADS: 12
NUMBER OF SECTORS PER TRACK: 34
CRC'S GENERATED FOR SECTORS: 0000001–0417792
DISK SECTORS NOT READABLE:

NO BAD SECTORS
DISK CRC'S:

| DISK SECTOR RANGE | GENERATED CRC |
|---|---|
| 0000001–0019531 | 0xdc05c313 |
| 0019532–0039062 | 0x4b5a0bd0 |
| 0039063–0058593 | 0xd2d94353 |
| 0058594–0078124 | 0x6cafc73c |
| 0078125–0097655 | 0x99bdc213 |
| 0097656–0117186 | 0x1df67658 |
| 0117187–0136717 | 0x28c85f23 |
| 0136718–0156248 | 0x92bfbb62 |
| 0156249–0175779 | 0x08ffc873 |
| 0175780–0195310 | 0x313654f6 |
| 0195311–0214841 | 0x3854135c |
| 0214842–0234372 | 0x71eec31e |
| 0234373–0253903 | 0x6a43190c |
| 0253904–0273434 | 0x6fd903c8 |
| 0273435–0292965 | 0x65d05476 |
| 0292966–0312496 | 0xec9e8f02 |
| 0312497–0332027 | 0xab6797b2 |
| 0332028–0351558 | 0x840bc369 |
| 0351559–0371089 | 0xa8ab6174 |
| 0371090–0390620 | 0x1727c690 |
| 0390621–0410151 | 0x190eab56 |
| 0410152–0417792 | 0x76b4465a |

APPENDIX 7

IMGREST.LOG

IMAGE RESTORE LOG ENTRY
(INFORMATION ABOUT IMAGE ON TAPE)
PHYSICAL DISK
CHARACTERISTICS OF DISK THAT WAS BACKED UP:

DISK NUMBER: 1
TOTAL NUMBER OF DISK SECTORS: 0417792
ASSUMED BYTES PER SECTOR: 512
NUMBER OF CYLINDERS: 1024
NUMBER OF HEADS: 12
NUMBER OF SECTORS PER TRACK: 34
DISK SECTORS BACKED UP: 0000001–0417792
BACKUP SIGNATURE (USER INPUT):

Sargent Joe Puhr
Boulder County Sheriff's Office
case # 2489532
Suspect Berine Marasco
date 3/21/96
DISK SECTORS NOT READABLE AT TIME OF BACKUP:

NO BAD SECTORS
CRC'S GENERATED AT TIME OF BACKUP:

| DISK SECTOR RANGE | GENERATED CRC |
|---|---|
| 0000001–0019531 | 0xe78b767d |
| 0019532–0039062 | 0x4b5a0bd0 |
| 0039063–0058593 | 0xbd83d583 |
| 0058594–0078124 | 0x6cafc73c |
| 0078125–0097655 | 0x99bdc213 |
| 0097656–0117186 | 0x1df67658 |
| 0117187–0136717 | 0x062a9fb9 |
| 0136718–0156248 | 0x92bfbb62 |
| 0156249–0175779 | 0x08ffc873 |
| 0175780–0195310 | 0x9a581650 |
| 0195311–0214841 | 0x3854135c |
| 0214842–0234372 | 0x71eec31e |
| 0234373–0253903 | 0x6a43190c |
| 0253904–0273434 | 0x6fd903c8 |
| 0273435–0292965 | 0x65d05476 |
| 0292966–0312496 | 0xec9e8f02 |
| 0312497–0332027 | 0xab6797b2 |
| 0332028–0351558 | 0x840bc369 |
| 0351559–0371089 | 0xa8ab6174 |
| 0371090–0390620 | 0x1727c690 |
| 0390621–0410151 | 0x190eab56 |
| 0410152–0417792 | 0x76b4465a |

IMAGE RESTORE LOG ENTRY
PHYSICAL DISK
CHARACTERISTICS OF RESTORE DESTINATION DISK:

DISK NUMBER: 1
TOTAL NUMBER OF DISK SECTORS: 0417792
ASSUMED BYTES PER SECTOR: 512
NUMBER OF CYLINDERS: 1024
NUMBER OF HEADS: 12
NUMBER OF SECTORS PER TRACK: 34
DISK SECTORS RESTORING: 0000001–0417792
DISK SECTORS NOT WRITABLE AT TIME OF RESTORE:

NO BAD SECTORS
DISK SECTORS NOT
READABLE AT TIME OF RESTORE VERIFY PASS:

NO BAD SECTORS
CRC VERIFY PASS COMPARE TABLE:

| DISK SECTOR RANGE | EXPECTED CRC | GENERATED CRC | PASS/FAIL |
|---|---|---|---|
| 0000001–0019531 | 0xe78b767d | 0xe78b767d | PASS |
| 0019532–0039062 | 0x4b5a0bd0 | 0x4b5a0bd0 | PASS |
| 0039063–0058593 | 0xbd83d583 | 0xbd83d583 | PASS |
| 0058594–0078124 | 0x6cafc73c | 0x6cafc73c | PASS |
| 0078125–0097655 | 0x99bdc213 | 0x99bdc213 | PASS |
| 0097656–0117186 | 0x1df67658 | 0x1df67658 | PASS |
| 0117187–0136717 | 0x062a9fb9 | 0x062a9fb9 | PASS |

APPENDIX 7-continued

IMGREST.LOG

| | | | |
|---|---|---|---|
| 0136718–0156248 | 0x92bfbb62 | 0x92bfbb62 | PASS |
| 0156249–0175779 | 0x08ffc873 | 0x08ffc873 | PASS |
| 0175780–0195310 | 0x9a581650 | 0x9a581650 | PASS |
| 0195311–0214841 | 0x3854135c | 0x3854135c | PASS |
| 0214842–0234372 | 0x71eec31e | 0x71eec31e | PASS |
| 0234373–0253903 | 0x6a43190c | 0x6a43190c | PASS |
| 0253904–0273434 | 0x6fd903c8 | 0x6fd903c8 | PASS |
| 0273435–0292965 | 0x65d05476 | 0x65d05476 | PASS |
| 0292966–0312496 | 0xec9e8f02 | 0xec9e8f02 | PASS |
| 0312497–0332027 | 0xab6797b2 | 0xab6797b2 | PASS |
| 0332028–0351558 | 0x840bc369 | 0x840bc369 | PASS |
| 0351559–0371089 | 0xa8ab6174 | 0xa8ab6174 | PASS |
| 0371090–0390620 | 0x1727c690 | 0x1727c690 | PASS |
| 0390621–0410151 | 0x190eab56 | 0x190eab56 | PASS |
| 0410152–0417792 | 0x76b4465a | 0x76b4465a | PASS |
| | | | OVERALL PASS |

The embodiments of the invention in which an exclusive property or privilege is claimed are defined as follows:

1. A method of replicating the sectors of a first hard disk on a second hard disk, wherein the second hard disk is of larger size than that of the first hard disk, the method comprising:

copying sectors of the first hard disk onto a temporary storage media;

determining dimensioning parameters of the first hard disk and recording the dimensioning parameters on the temporary storage media, the dimensioning parameters including a number of cylinders, a number of heads, and a number of sectors per track;

configuring the second hard disk to have the same dimensioning parameters as the first hard disk; and reading sectors of the first hard disk from the temporary storage media and recording sectors of the first hard disk on the second hard disk in accordance with the dimensioning parameters if the first hard disk.

2. The method of claim 1, wherein a predetermined number of the sectors of the first hard disk are copied as a file onto the temporary storage media; and wherein the first checking information is computed with respect to the file.

3. The method of claim 1, wherein copying sectors of the first hard disk onto a temporary storage media involves recording the sectors on magnetic tape.

4. The method of claim 1, further comprising precluding recording on the first hard disk while implementing steps of the method.

5. The method of claim 1, further comprising recording a signature on the temporary storage media.

6. A computer program product for replicating the contents of a first hard disk on a second hard disk, wherein the second hard disk is of larger size than that of the first hard disk, the computer program product comprising computer readable code stored in a memory, the steps of the program comprising:

(1) generating an output menage requesting a selection of either a backup operation mode or a restore operation mode;

(2) responding to input indicative of the backup operation mode by:

copying sectors of the first hard disk onto a temporary storage media;

determining dimensioning parameters of the first hard disk and recording the dimensioning parameters on the temporary storage media, the dimensioning parameters including a number of cylinders, a number of heads, and a number of sectors per track;

(3) configuring the second hard disk to have the same dimensioning parameters as the first hard disk;

(4) responding to input indicative of the restore operation by reading sectors of the first hard disk from the temporary storage media and recording sectors of the first hard disk on the second hard disk in accordance with the dimensioning parameters of the first hard disk.

7. The computer program product of claim 6, the steps of the program further comprising:

further responding to input indicative of the backup operation mode by recording first checking information on the temporary storage media, the first checking information being computed with respect to sectors read from the first hard disk;

further responding to input indicative of the restore operation mode by computing second checking information with respect to sectors recorded on the second hard disk and using a comparison of the first checking information obtained from the temporary storage media and the second checking information to confirm integrity of the sectors recorded on the second hard disk.

8. The computer program product of claim 6, wherein recording first checking information on the temporary storage media involves recording the first checking information on two types of temporary storage media.

9. The computer program product of claim 8, wherein a first type of temporary storage media is magnetic tape and a second type of temporary storage media is magnetic disk.

10. The computer program product of claim 6, wherein a predetermined number of the sectors of the first hard disk are copied as a file onto the temporary storage media; and wherein the first checking information is computed with respect to the file.

11. The computer program product of claim 6, the steps of the program further comprising further responding to input indicative of the backup operation mode by precluding recording on the first hard disk.

12. The computer program product of claim 6, the steps of the program further comprising further responding to input indicative of the backup operation mode by recording a signature on the temporary storage media.

13. The computer program product of claim 6, wherein, prior to generating the output message requesting the selection, the steps of the program comprise copying boot-enabling information, copying memory managing information, and copying RAM drive-enabling information into the memory.

14. The computer program product of claim 6, the steps of the program further comprising further responding to input indicative of the backup operation mode by providing an estimated backup processing completion parameter.

15. The computer program product of claim 14, the steps of the program further comprising further responding to input indicative of the backup operation mode by periodically providing an estimated time to completion parameter.

16. The computer program product of claim 6, wherein copying sectors of the first hard disk onto a temporary storage media comprises copying the sectors of the first hard disk onto magnetic tape.

17. A computer program product for replicating the contents of a hard disk of a source computer on a hard disk of a destination computer without recording on the hard disk of the source computer, wherein the hard disk of the destination computer is of larger size than that of the hard disk of the source computer, the computer program product comprising computer readable code stored in a memory and executable by both the source computer and the destination computer, the steps of the program comprising:

(1) generating an output message requesting a selection of either a backup operation mode or a restore operation mode;

(2) responding to input indicative of the backup operation mode by:
copying sectors of the hard disk of the source computer onto a temporary storage media;
determining dimensioning parameters of the hard disk of the source computer and recording the dimensioning parameters on the temporary storage media, the dimensioning parameters including a number of cylinders, a number of heads, and a number of sectors per track;

(3) configuring the hard disk of the destination computer to have the same dimensioning parameters as the hard disk of the source computer;

(4) responding to input indicative of the restore operation mode by reading sectors of the hard disk of the source computer from the temporary storage media and recording sectors of the hard disk of the source computer on the hard disk of the destination computer in accordance with the dimensioning parameters of the hard disk of the source computer.

18. A computer program product for replicating the contents of a hard disk of a source computer on a hard disk of a destination computer without recording on the hard disk of the source computer, wherein the hard disk of the destination computer is of larger size than that of the hard disk of the source computer, the computer program product comprising computer readable code stored in a memory and executable by source computer, steps of the program comprising:

copying sectors of the hard disk of the source computer onto a temporary storage media;

determining dimensioning parameters of the hard disk of the source computer and recording the dimensioning parameters on the temporary storage media, the dimensioning parameters including a number of cylinders, a number of heads, and a number of sectors per track;

configuring the hard disk of the destination computer to have the same dimensioning parameters as the hard disk of the source computer;

recording first checking information on the temporary storage media, the checking information being computed with respect to sectors read from the first hard disk.

19. A computer program product for replicating the contents of a hard disk of a source computer on a hard disk of a destination computer, wherein the hard disk of the destination computer is of larger size than that of the hard disk of the source computer, the computer program product comprising computer readable code stored in a memory and executable by the destination computer, the steps of the program comprising:

configuring the hard disk of the destination computer to have dimensioning parameters of the hard disk of the source computer, the dimensioning parameters including a number of cylinders, a number of heads, and a number of sectors per track; and, recording sectors of the hard disk of the source computer from a temporary storage media and recording sectors of the hard disk of the source computer on the hard disk of the destination computer in accordance with the dimensioning parameters of the hard disk of the source computer.

20. The method of claim 1, further comprising:

recording first checking information on the temporary storage media, the checking information being computed with respect to sectors read from the first hard disk;

computing second checking information with respect to sectors recorded on the second hard disk;

using a comparison of the first checking information obtained from the temporary storage media and the second checking information to confirm integrity of the sectors recorded on the second hard disk.

21. The method of claim 20, wherein a predetermined number of the sectors of the first hard disk are copied as a file onto the temporary storage media; and wherein the first checking information is computed with respect to the file.

22. A method of replicating the sectors of a first hard disk on an second hard disk, wherein the second hard disk is of larger size than that of the first hard disk, the method comprising:

(1) copying sectors of the first hard disk onto a first storage media which serves as a temporary storage media;

(2) storing statistics of the copying of step (1) on a second storage media;

(3) reading sectors of the first hard disk from the temporary storage media and recording sectors of the first hard disk on the second hard disk.

23. The method of claim 22, wherein sectors of the first hard disk are copied as files onto the temporary storage media, and wherein the statistics stored on the second storage media include at least one of the following:

a number of files copied on the temporary storage media;

a file name; and, check information for a file copied on the temporary storage media.

24. The method of claim 22, wherein the first storage media is magnetic tape and the second temporary storage media is magnetic disk.

* * * * *